United States Patent [19]

Hatanai et al.

[11] Patent Number: 4,720,757
[45] Date of Patent: Jan. 19, 1988

[54] MAGNETIC HEAD FOR VERTICAL MAGNETIC RECORDING AND PROCESS FOR PRODUCING THE SAME

[75] Inventors: Takashi Hatanai; Keishi Nakashima, both of Nagaoka, Japan

[73] Assignee: Alps Electric Co., Ltd., Japan

[21] Appl. No.: 752,446

[22] Filed: Jul. 5, 1985

[30] Foreign Application Priority Data

Jul. 4, 1984 [JP] Japan ............................. 59-138749
Oct. 9, 1984 [JP] Japan ............................. 59-212083
Oct. 9, 1984 [JP] Japan ............................. 59-212084
Oct. 11, 1984 [JP] Japan ............................. 59-211522

[51] Int. Cl.$^4$ .................... G11B 5/17; G11B 5/187; G11B 5/265
[52] U.S. Cl. .................... 360/121; 360/118; 360/122; 360/123; 360/125
[58] Field of Search .............. 360/121, 118, 123, 122, 360/125, 126, 127

[56] References Cited

FOREIGN PATENT DOCUMENTS 0111818 7/1982 Japan ............................. 360/123

Primary Examiner—Robert S. Tupper
Attorney, Agent, or Firm—Guy W. Shoup

[57] ABSTRACT

A magnetic head for vertical magnetic recording having a leg portion formed on a core on the recording and reproducing side, which leg portion is put in connection with the recording and reproducing magnetic thin film and a leg portion formed on a core on the erasing side, which leg portion is put in connection with the erasing magnetic thin film. A recording and reproducing coil is provided on the leg, or pillar, portion formed on the core on the recording and reproducing side and an erasing winding, or coil, is provided in a groove, or on a pillar portion, formed on the core on the erasing side.

12 Claims, 27 Drawing Figures

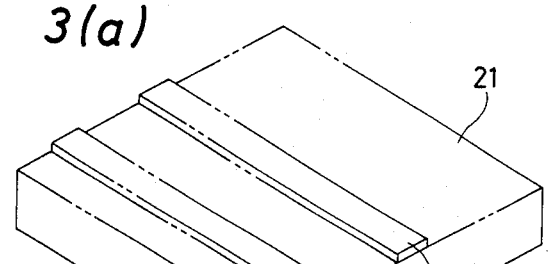
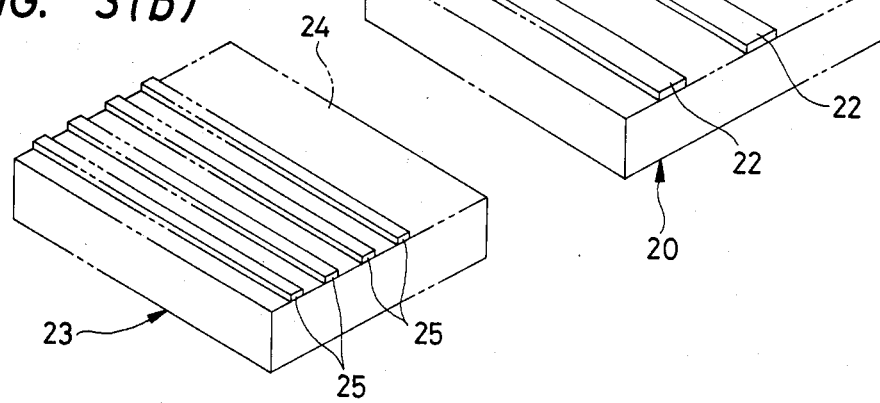
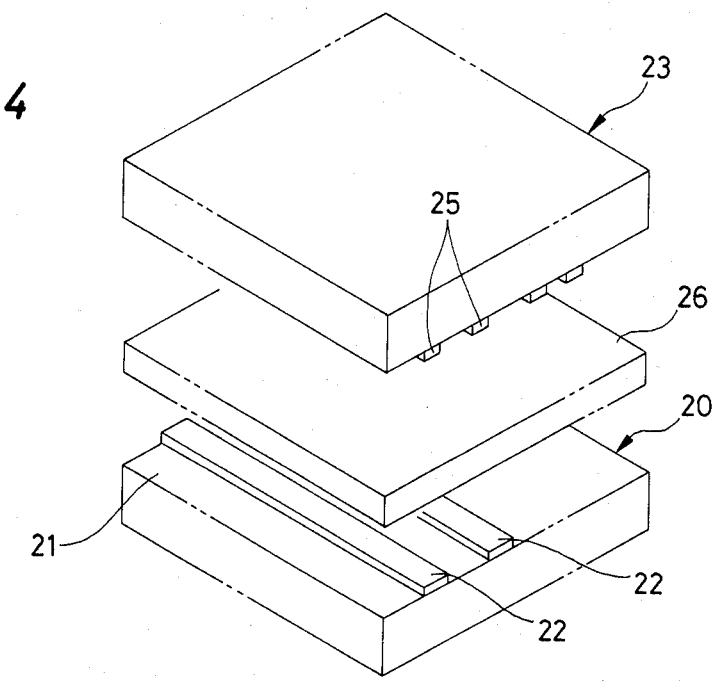

FIG. 8
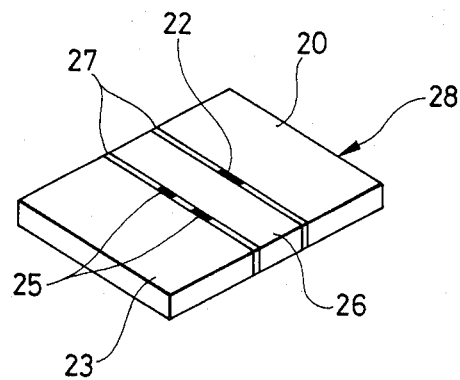
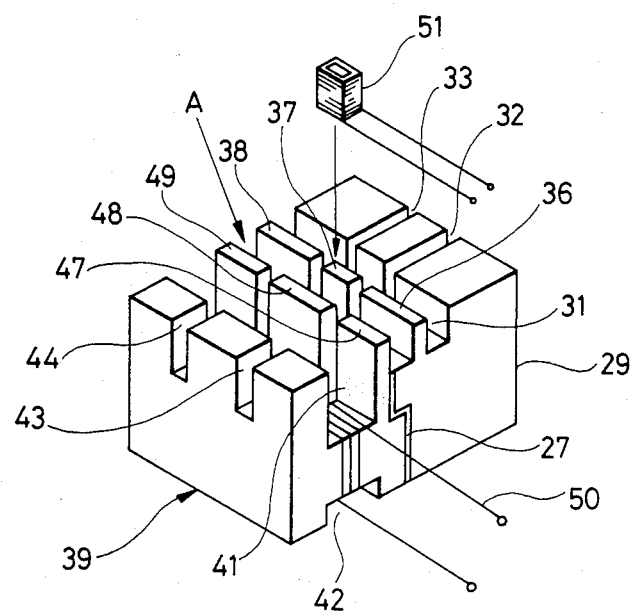

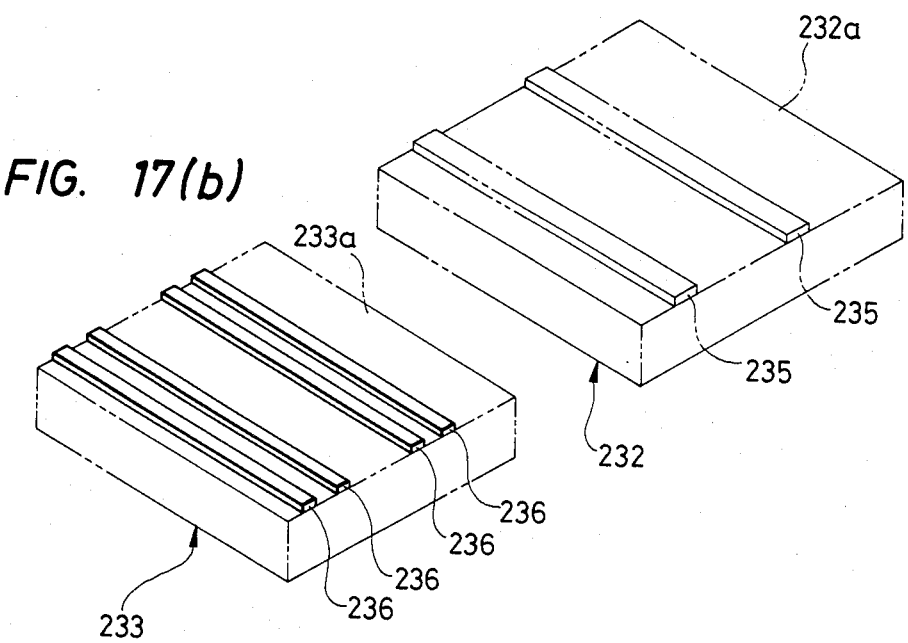
FIG. 17(a)
FIG. 17(b)
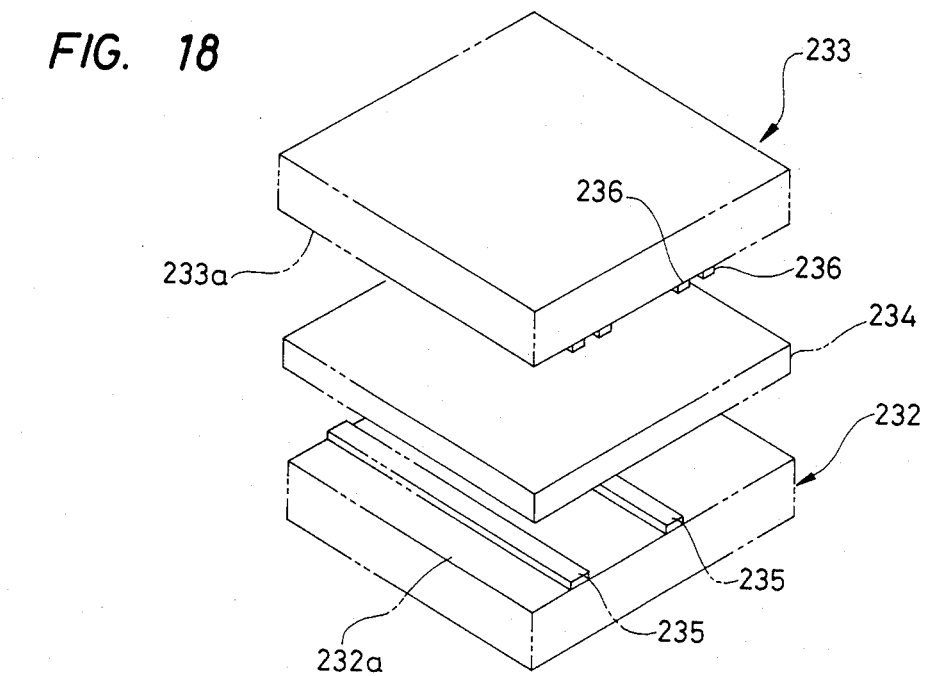
FIG. 18

MAGNETIC HEAD FOR VERTICAL MAGNETIC RECORDING AND PROCESS FOR PRODUCING THE SAME

BACKGROUND OF THE INVENTION

1. Field of the Invention

The present invention relates to a main pole excitation type magnetic head for vertical recording and process for producing the same.

2. Description of the Prior Art

A conventional mainpole excitation type magnetic head for vertical magnetic recording (hereinafter to be referred to as magnetic head) is of the structure as shown in FIGS. 1 (a) and (b), in which FIG. 1 (a) is a perspective view showing the magnetic head and FIG. 1 (b) is an exploded perspective view of the magnetic head. Referring to the drawings, 1 denotes a slider subassembly on the recording and reproducing side, which is formed of a slider member 2 made of ceramic, nonmagnetic ferrite, or the like and provided with a coil groove 2a and a protrusion 2b and a magnetic core 3 made of magnetic material such as ferrite in a substantially flat plate form, disposed on the side of the coil groove 2a of the slider member 2, and put in close contact with the inner side 2c of the protrusion 2b and fixed thereto with resin, fusion glass, or the like. On the flat portion formed of the protrusion 2b of the slider member 2 and the surface 3a of the magnetic core 3 not in contact with the slider member 2, there is provided magnetic thin film 4 for recording and reproducing formed from cobalt amorphous, permalloy series, or sendust series magnetic material by a method such as sputtering, evaporation, or the like.

Symmetrically with the slider subassembly on the recording and reproducing side, there is provided a slider subassembly 5 on the erasing side, which is formed of a slider member 6 made of ceramic, nonmagnetic ferrite, or the like and provided with a coil groove 6a and a protrusion 6b, and a magnetic core 7 made of magnetic material such as ferrite in a substantially flat plate form, disposed on the side of the coil groove 6a of the slide member 6, and put in close contact with the inner side 6c of the protrusion 6b and fixed thereto with resin, fusion glass, or the like. On the flat portion formed of the protrusion 6b of the slider member 6 and the surface 7a of the magnetic core 7 not in contact with the slider member, there is provided magnetic thin film 8 for erasing formed from cobalt amorphous, permalloy series, or sendust series magnetic material by a method such as sputtering, evaporation, or the like.

Numeral reference 9 denotes a center slider member, which is provided with coil grooves 9a, 9b at the positions opposite to the coil grooves 2a, 6a of the slider members 2, 6.

In constructing the magnetic head, the slider subassembly 1, the center slider member 9, and the slider subassembly 5 are assembled, when relative positioning of the magnetic thin film 4 and the magnetic thin film 8, 8 is made so that, as shown in FIG. 2, the effective record width 13 recorded by the magnetic thin film 4 may be erased by the magnetic thin film 8, 8 to a specified record width 14, and then these members are fixed together with adhesive, resin, fusion glass, or the like 10. Incidentally, the arrow 15 in FIG. 2 indicates the direction of the movement of a magnetic recording medium (not shown).

Thereafter, a recording and reproducing winding 11 and an erasing winding 12 are provided for the assembly and its sliding surface for sliding along the magnetic recording medium (not shown) is ground or lapped and the magnetic head is thus completed.

In the above described process, the magnetic thin film 4, 8 must be applied to the surface formed of the protrusions 2b, 6b and the sides 3a, 7a of the magnetic cores 3, 7 not in contact with the slider members 2, 6 being finished to an even surface after the magnetic cores 3, 7 have been put in close contact with the inner sides 2c, 6c of the protrusions 2b, 6b of the slider members 2, 6 and fixed thereto. Otherwise, gaps would be formed between the inner sides 2c, 6c of the protrusions 2b, 6b of the slider members 2, 6 and the cores 3, 7 thereby to split the magnetic film 4, 8 at the joined portion of the slider members 2, 6 and the magnetic cores 3, 7 and the magnetic circuit would thereby be broken. The same trouble would occur if there were formed differences in level between the slider members 2, 6 and the magnetic cores 3, 7.

To prevent such trouble, the protrusions 2b, 6b of the slider members 2, 6 and the sides 3a, 7a of the magnetic cores 3, 7 must be finished to even common surfaces. Further, the magnetic thin film 4, 8 must be correctly positioned relative to each other after the slider subassembly 1, the center slider member 9, and the slider subassembly 5 have been assembled, and, after the positioning has been made, the three members, namely, the slider subassembly 1, the denter slider 9, and the slider subassembly 5 must be fixed together. Such being the case, a considerably long time is taken for the positioning, the workability is lowered very much, and, in addition, the task for attaining the accurate positioning is so difficult that skilled workers are needed therefor. Furthermore, since the slider subassembly 1, the center slider member 9, and the slider subassembly 5 must be assembled and fixed together, the sliding surface of the magnetic head along the magnetic recording medium, or more specifically (refer to FIG. 1 (a), the top surfaces 2d of the slider subassembly 1, 9c of the center slider member 9, and 6d of the slider subassembly 5 are liable to produce differences in level therebetween. Hence, a grinding process becomes necessary to remove such differences in level and provide an even common surface. As to the winding work to provide windings 11, 12 (FIG. 1 (b)), since thin wires must be inserted into the thin winding holes formed by the center slider member 9 and the slider members 2, 6 and wound into coils, the workability is kept very low, breakage of the wire is liable to occur and man-hours for the winding become larger. Besides, since a winding machine cannot be utilized for such winding work, skill is required of the winding workers.

According to the structure of the prior art magnetic head, the coil grooves 9a, 9b are disposed on the center slider member 9. Since these coil grooves 9a, 9b must be provided there, when it is attempted to shorten the distance between the magnetic thin film 4 and the magnetic thin film 8, 8, there is a certain limit in the attainable distance. Therefore, when it is intended to make high-density recording on a magnetic medium of a smaller radius of curvature, 3 or 3.5 inches in diameter, for example, a certain restriction will be found in carrying out the intention. The situation will be described below in more detail. In the case where the distance between the center of rotation of a magnetic medium and a magnetic head is smaller, or, in other words, when the magnetic recording medium is smaller in diameter or it is attempted to take magnetic recording closer to the center, the magnetic recording medium rotates in a small-diametered circular arc C with reference to the magnetic head H. Then, if the distance 1 between the magnetic thin film 4 and 8 is larger, the positions to be erased by the erasing magnetic thin film 8, 8 at both ends of the effective record width W recorded by the recording and reproducing magnetic thin film 4 will deviate from the right positions to be erased. For this reason, there have been such problems that it is unable to make record in a smaller-diametered magnetic recording medium or a magnetic recording medium cannot be effectively utilized inward to the smaller-diametered portion.

Furthermore, since the erasing coil must be provided by winding a wire across the entire length of the erasing magnetic core, the produced magnetic flux leaks out to unnecessary portions, or a large amount of so-called leakage flux is produced, and the erasing current efficiency is thereby lowered. The workability is also lowered because the winding must be made manually and the manufacturing cost becomes higher because a larger amount of wire material is needed for the coil.

In addition, it has come to be known that the magnetic field produced by the erasing current flowing through the erasing coil may adversely affect the magnetic recording by the recording signal current flowing through the recording and reproducing coil. That is, the erasing magnetic field produced by the erasing current may be turned out to be leakage flux coming into the core block on the recording and reproducing side, and the recording magnetic field produced by the recording and reproducing coil may thereby be disturbed, and desired signal may become unable to be recorded in the recording medium. Due to the leakage of the erasing magnetic field, there also arises a problem that the erasing efficiency is worsened.

SUMMARY OF THE INVENTION

The present invention has been made in view of the above mentioned various problems and disadvantages involved in the prior art and it is the principal object of the present invention to provide a magnetic head for vertical magnetic recording easier to attain accuracy in its processing, producible with higher workability, simpler in structure, enabling the distance between the recording and reproducing magnetic thin film and the erasing magnetic thin film to be made further smaller, not causing the erasing signal flowing through the erasing coil to adversely affect the function of the recording signal current, with higher erasing current efficiency, and mass-producible at low cost.

The present ivention is characterized, in a magnetic head for vertical magnetic recording including a slider subassembly made of nonmagnetic material and provided with magnetic thin film for recording and reproducing and magnetic thin film for erasing disposed thereon vertically to a magnetic recording medium, a core on the recording and reproducing side made of magnetic material and disposed below the slider assembly and a core on the erasing side made likewise of magnetic material and disposed below the slider subassembly, in that the recording and reproducing magnetic thin film formed on the slider subassembly is put in connection with a leg portion of the core on the recording and reproducing side and the erasing magnetic thin film formed on the slider subassembly is put in connection with a leg portion of the core on the erasing side.

The present invention is characterized also in that it is produced through the step of providing a slider subassembly by assembling a slider member on the recording and reproducing side and a slider member on the erasing side, each thereof being produced by forming a plurality of strips of magnetic thin film disposed at predetermined spaces on the surface of a slider blank made of nonmagnetic material in a flat rectangular parallelopipe, with a nonmagnetic center block interposed therebetween in such a manner that the strips of magnetic thin film will face each other, positioning these members in a specified relative positional relationship, fixing them together, and then cutting the thus formed body into a predetermined dimensions thereby to provide the slider subassemblies, the step of providing a core on the recording and reproducing side by providing an elongated rectangular parallelopiped magnetic core block of magnetic material, longituninally, with a coil groove, a cut for winding, and a cut for combination with the core on the erasing side and, transversely, with a plurality of grooves and then cutting the same into a predetermined dimension thereby to provide the cores on the recording and reproducing side, the step of providing a core on the erasing side by providing an elongated rectangular parallelopiped magnetic core block likewise made of magnetic material, longitudinally, with one each coil groove in the top and bottom surfaces of the core block and a cut for forming a protrusion for combination with the core on the recording and reproducing side and, transversely, with a plurality of grooves, and then cutting the same into predetermined dimension thereby to provide the cores on the erasing side, and the step of assembling and fixing together the core on the recording and reproducing side and the core on the erasing side, then mounting a coil for recording and reproducing on a leg portion formed by the coil groove and the grooves on the core on the recording and reproducing side and providing a winding for erasing in the coil groove on the core on the erasing side thereby to provide a magnetic core subassembly, and then joining the magnetic core subassembly and the slider subassembly together thereby to provide the magnetic head.

The present invention is characterized further in that the recording and reproducing coil and the erasing coil are adapted to be positioned at different heights and be disposed to partly overlap each other when viewed in the direction parallel to the axes of the coils from the side of the slider subassembly in order that the distance between the recording and reproducing magnetic thin film and the erasing magnetic thin film may be made still smaller by improving the relative positioning of the recording and reproducing coil and the erasing coil provided for the core block on the recording and reproducing side and the core block on the erasing side, respectively. By disposing both the coils to partly overlap each other, the distance between these coils, and hence the distance between the magnetic thin film for recording and reproducing and that for erasing can be really made smaller.

The present invention is characterized also in that a magnetical insulating spacer is interposed between the joining surfaces of the core block on the recording and reproducing side and the core block on the erasing side in order that the erasing magnetic flux from the erasing coil may not leak out to the core block on the recording and reproducing side.

The present invention is further characterized, in the magnetic head for vertical magnetic recording including a slider subassembly made of nonmagnetic material and provided with magnetic thin film for recording and reproducing and magnetic thin film for erasing disposed thereon vertically to a magnetic recording medium, a recording and reproducing core made of magnetic material disposed on the side of the slider subassembly not facing the magnetic recording medium and provided with a recording and reproducing coil, and an erasing core likewise made of magnetic material disposed on the side of the slider subassembly not facing the magnetic recording medium and provided with an erasing coil, in that a first pillar portion is formed on the recording and reproducing core by providing a plurality of grooves thereon, which first pillar portion is adapted to be provided with the recording and reproducing coil and put in connection with the recording and reproducing magnetic thin film, and a second pillar portion taller than the first pillar portion is formed on the erasing core by providing a plurality of grooves, deeper than the above mentioned grooves, thereon, which second pillar is adapted to be provided with the erasing coil and put in connection with the erasing magnetic thin film.

BRIEF DESCRIPTION OF THE DRAWINGS

FIGS. 3 to 6 are perspective views showing the process for producing a slider subassembly of the invention;

FIGS. 8 and 9 are perspective views showing structure of a magnetic head for vertical magnetic recording of the invention;

FIGS. 17 to 21 are drawings for explaining the process for producing the above magnetic head, in which FIGS. 17 (a) and (b) are process drawings showing the process for forming magnetic thin film on slider blanks, FIG. 18 is a process drawing showing the process for assembling the slider blanks and a center block, FIG. 19 is a process drawing showing a state of the members as joined together after being assembled as shown in FIG. 18, FIG. 20 is a process drawing showing a slider subassembly cut out from the joined body as shown in FIG. 19, and FIGS. 21 (a) and (b) are process drawings showing the process for forming a recording and reproducing core and an erasing core.

DESCRIPTION OF THE PREFERRED EMBODIMENTS

A preferred embodiment of the present invnetion will be described with reference to FIGS. 3 to 9 in the following. FIGS. 3 (a) and (b) are drawings showing the process for forming magnetic thin film on the surface of a slider member made of nonmagnetic material, in which FIG. 3 (a) shows a slider blank in a flat rectangular parallelopiped form made of nonmagnetic material such as ceramic, nonmagnetic ferrite, carbon compound material, or the like, said slider blank 20 being provided with magnetic thin film 22 for recording and reproducing formed on the surface 21 thereof from magnetic material such as cobalt amorphous, permalloy series, sendust series, or the like by evaporation, sputtering, epitaxial method, or the like in a plurality of strips of the film disposed at predetermined spaces.

Figure 1A:
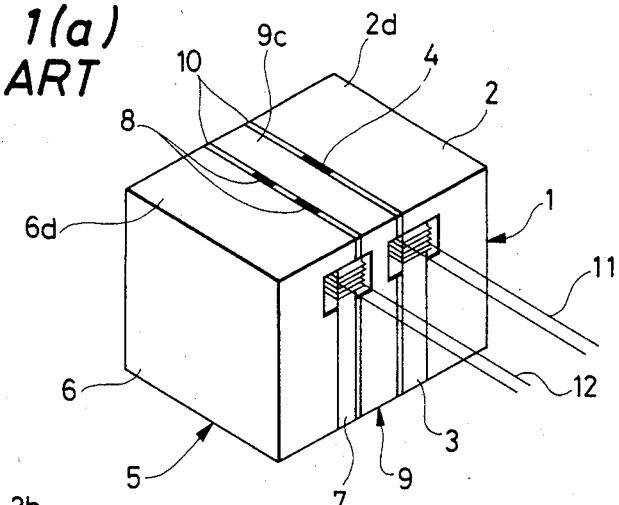
FIGS. 1 (a) and (b) are perspective views showing structure of a conventional magnetic head for vertical magnetic recording.
Figure 1B:
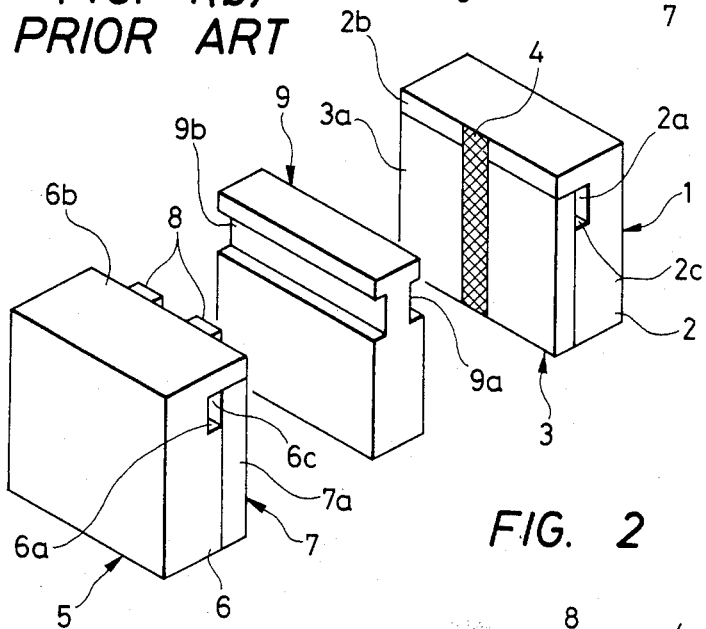
Figure 2:
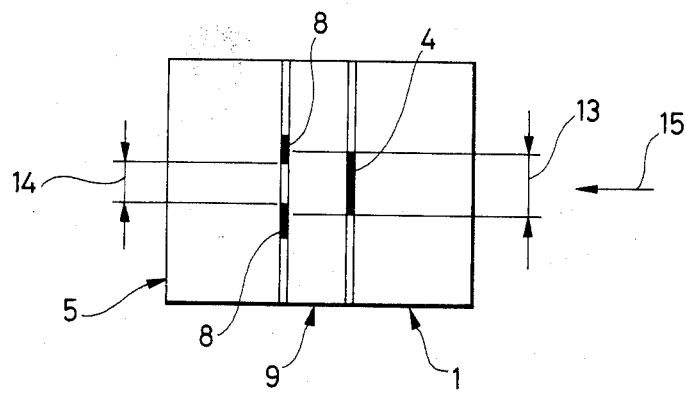
FIG. 2 is a plan view showing relative positioning of the magnetic thin film on the recording and reproducing side and that on the erasing side.

FIG. 3 (b) shows a slider blank 23 made in a flat rectangualr parallelopiped form likewise of nonmagnetic material such as ceramic, nomagnetic ferrite, carbon compound material, or the like, and the surface 24 of the slider blank 23 is provided with magnetic thin film 25 for erasing formed from magnetic material such as cobalt amorphous, permalloy series, sendust series, or the like by evaporation, sputtering, epitaxial method, or the like in a plurality of strips of the film disposed at predetermined spaces, so that the positional relationship of the erasing magnetic thin film 8 relative to the recording and reproducing magnetic thin film 4 as shown in FIG. 2 may be retained here.

Figure 5:
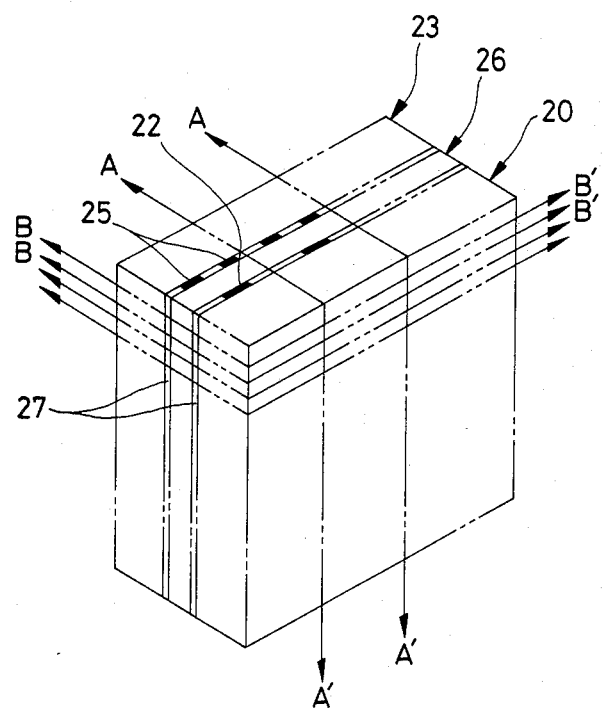
Figure 6:
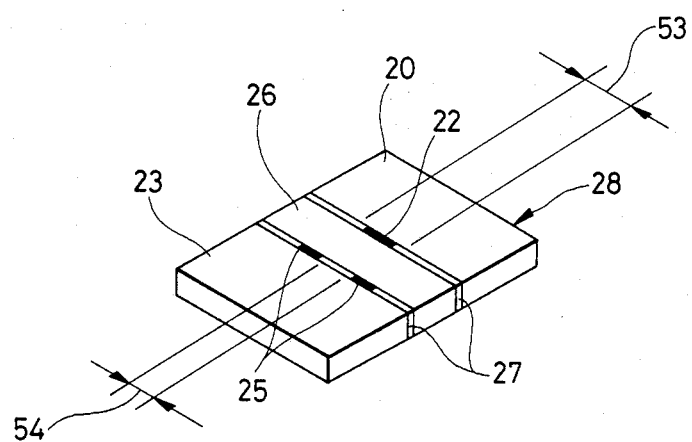

FIG. 4 is a drawing showing a process for assembling the above slider blank 20 with the magnetic thin film 22 formed thereo and the above slider blank 23 with the magnetic thin film 25 formed thereon with a center block 26 made of the same material as the above slider blanks 20, 23 in a flat rectangular parallelopiped form interposed therebetween, where relative positioning among the slider blanks 20, 23 and the center block 26 is made so that the effective record width 53 to be recorded by the magnetic thin film 22 may be erased by the magnetic thin film 25, 25 in two segments into a specified record width 54. Thereafter, the members are fixed together with adhesive, resin, fusion glass, or the like 27, and then cut along the lines A—A' and B—B' into a number of slider subassemblies 28. (FIGS. 4 to 6.)

The process for producing a magnetic core to be combined with the described slidder subassembly 28 will be given in the following referring to FIGS. 7 (a) and (b).

Figure 7A:
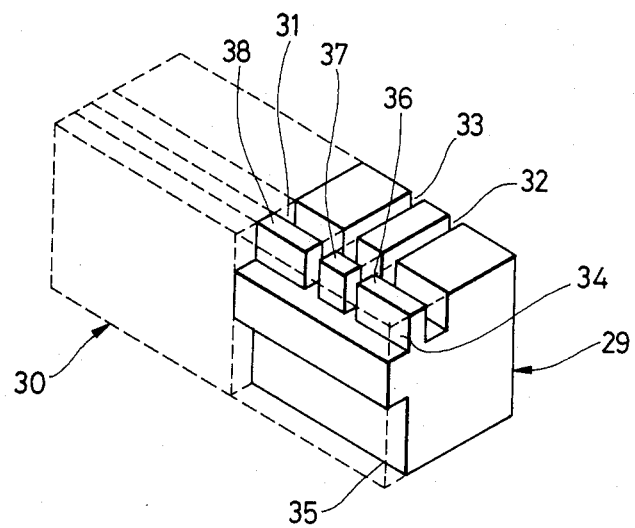
FIGS. 7 (a) and (b) are perspective views showing the process for producing magnetic cores of the invention.
Figure 7B:
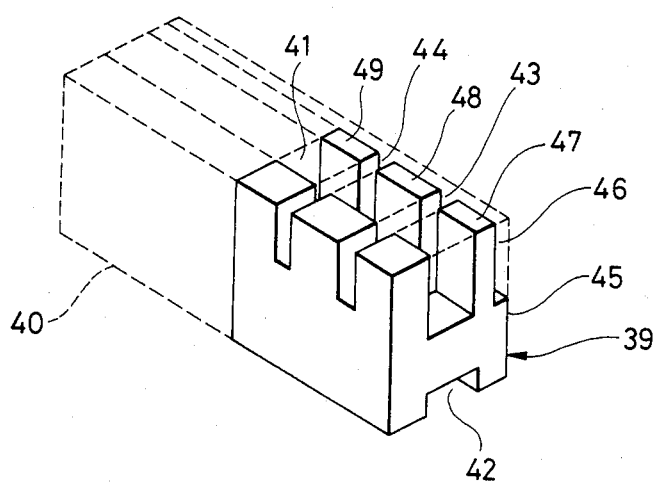

FIG. 7 (a) shows the process for forming a magnetic core 29 on the recording and reproducing side. The magnetic core 29 is produced from an elongated rectangular parallelopiped block 30 as a magnetic core blank made of magnetic material such as ferrite, sendust, or the like. The elongated rectangular parallelopiped block 30 is longitudinally provided with substantially U-shaped coil groove 31 and cuts 34, 35, and transversely provided with a plurality of pairs of grooves 32, 33 crossing the coil groove 31 at right angles, whereby three leg portions 36, 37, 38 are formed on the magnetic core 29 bing defined by the coil groove 31, the grooves 32, 33, and the cut 34.

As described above, a plurality of the magnetic cores 29 are formed in the block 30, and the magnetic cores 29 on the recording and reproducing side are produced by cutting the block 30 into a predetermined dimensions.

FIG. 7 (b) shows the process for forming a magnetic core 39 on the erasing side similar to the process for forming the magnetic core 29 on the recording and reproducing side. The magnetic core 39 on the erasing side is made from an elongated rectangular parallelopiped block 40 as a magnetic core blank of magnetic material such as ferrite, sendust, or the like. The elongated rectangular parallelopiped block 40 is longitudinally provided with coil grooves 41, 42 formed in the top and bottom surfaces thereof, and the block 40 is transversely provided with grooves 43, 44 crossing the coil groove 41 at right angles for allowing magnetic flux to be effectively transmitted to the magnetic thin film 25, 25 and a cut 46 for forming a protrusion 45 for combination with the magnetic core 29.

A plurality of the magnetic cores 39 are formed in the block 40 and the magnetic core on the erasing side 39 is produced by cutting the block 40 into predetermined dimensions. The magnetic core 39 is provided with three leg portions 47, 48, 49 being defined by the coil groove 41 and the grooves 43, 44.

The method for assembling the slider subassembly 28 and the magnetic cores 29, 39 produced as above will be described referring to FIG. 8.

First, the magnetic core 29 and the magnetic core 39 are positioned such that the cut 35 of the magnetic core 29 and the protrusion 45 of the magnetic core 39 are fitted with each other and the same are fixed together with adhesive, resin, fusion glass, or the like 27, and then, a winding 50 is provided in the coil grooves 41, 42 of the magnetic core 39. Succeeding thereto, a coil 51 on the recording and reproducing side is mounted on the leg portion 37 of the magnetic core 29, which coil 51 has been produced in advance by the method, generally called "self bonding method", namely, the method first to wind a wire into a coil in hot air blown thereto and then to cool the same thereby to obtain a predetermined form of a coil.

Figure 9:
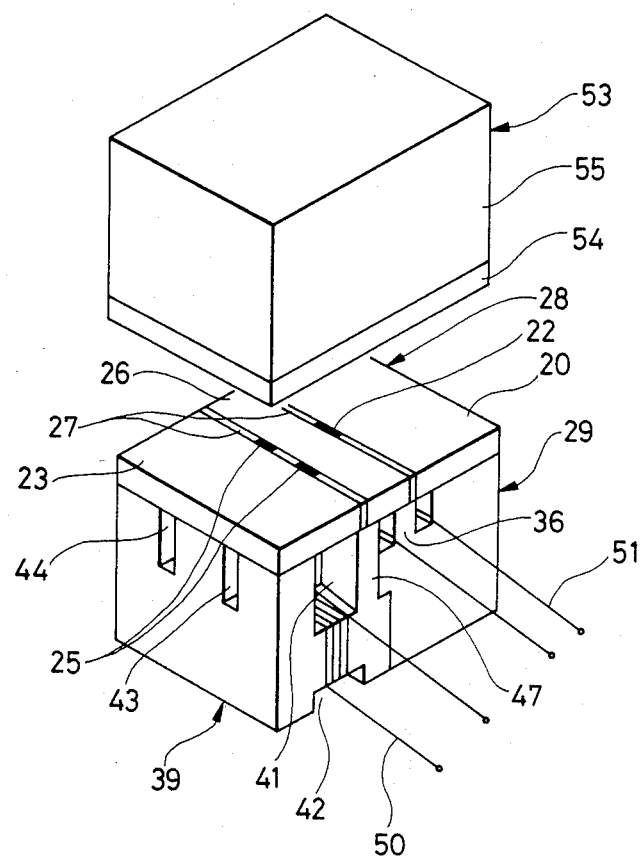

The magnetic core subassembly A formed of the magnetic core 29 and the magnetic core 39 that are fixed together and provided with the winding 50 and the coil 51 mounted thereon is then joined with the slider subassembly 28. FIG. 9 is a drawing schematically showing the constructed magnetic head of the invention, wherein the magnetic core subassembly A and the slider subassembly 28 are assembled so that the leg portion 37 of the magnetic core 29 and the magnetic thin film 22 on the slider subassembly 28, as well as the leg portion 48 of the magnetic core 39 and the magnetic thin film 25 on the slider subassembly 28, closely contact with each other, and then the same are fixed together with adhesive, synthetic resin, or the like 52.

The member denoted by numeric reference 53 is an image core block which is used for improving the recording, reproducing, and erasing efficiency. The image core block 53 is used being arranged to oppose the magnetic head with a magnetic recording medium (not shown) interposed therebetween. The image core 53 is formed of a slider portion 54 and an image core 55, in which the slider portion 54 is disposed at the sliding portion of the image core 53 to slide along the magnetic recording medium and made of carbon compound material, ceramic, glass, nonmagnetic ferrite, or the like having good lubricity for betterment of its antiwear quality and the image core 55 is made of magnetic material such as ferrite, permalloy, sendust, or the like.

Figure 10:
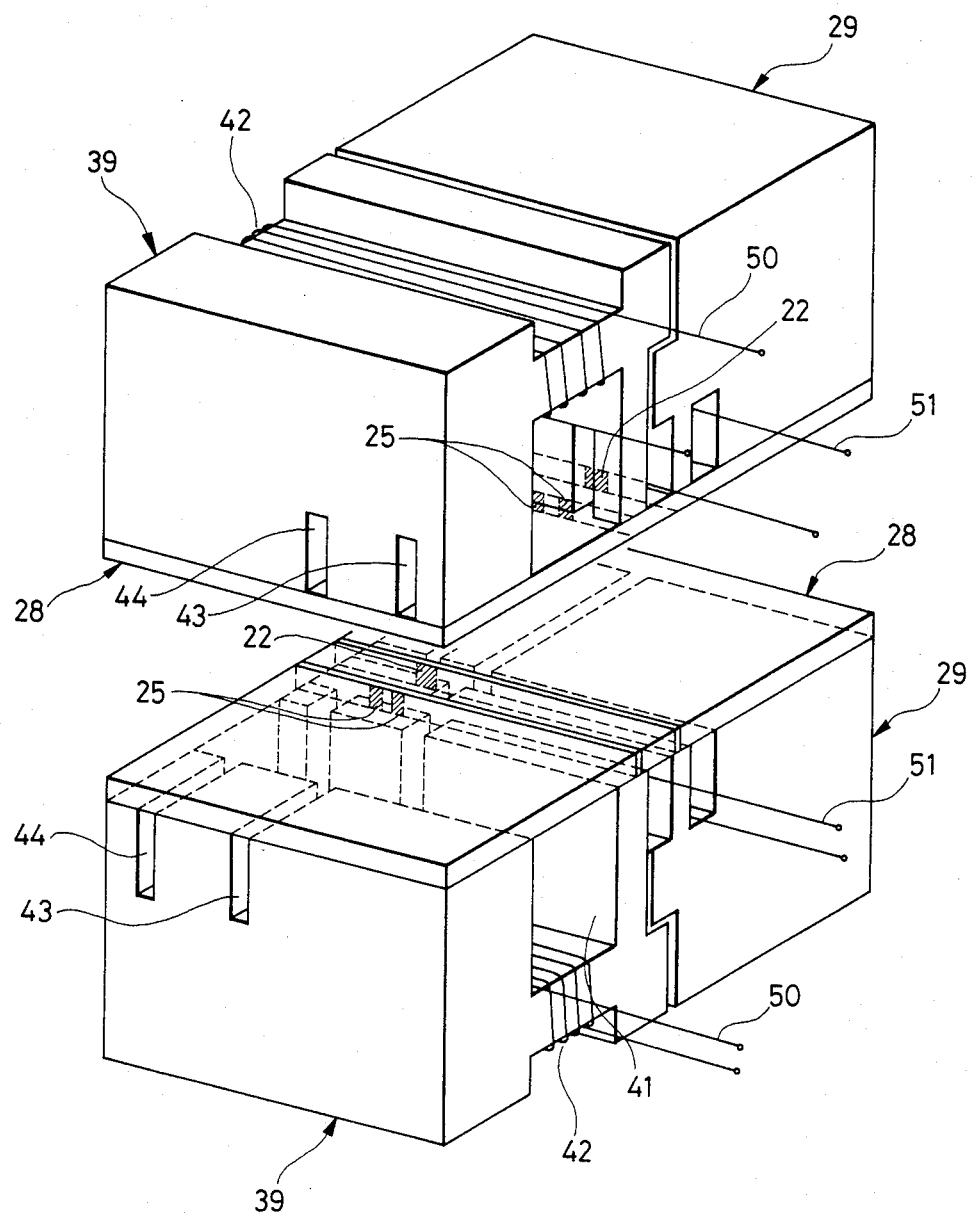
FIG. 10 is a perspective view showing an example of the use of the magnetic head of the invention.

FIG. 10 shows an example of use of the described magnetic heads, in which two magnetic heads of the construction of the invention are arranged to face each other with a magnetic recording medium (not shown) interposed therebetween but so arranged that the positions of the respective recording and reproducing tracks are not opposite to each other, whereby both sides of the magnetic recording medium are made usable for recording and reproducing. In this case, the magnetic heads are serving as the image cores for each other.

In the above description of formation of the magnetic film 22, 25 of the invention, it was described that the magnetic thin film 22, 25 is to be formed on the slider blanks 20, 23, respectively, but the magnetic thin film 22, 25 may be formed on both sides of the center block and then the slider blanks 20, 23 may be attached thereto.

(Another Embodiment)

Figure 11:
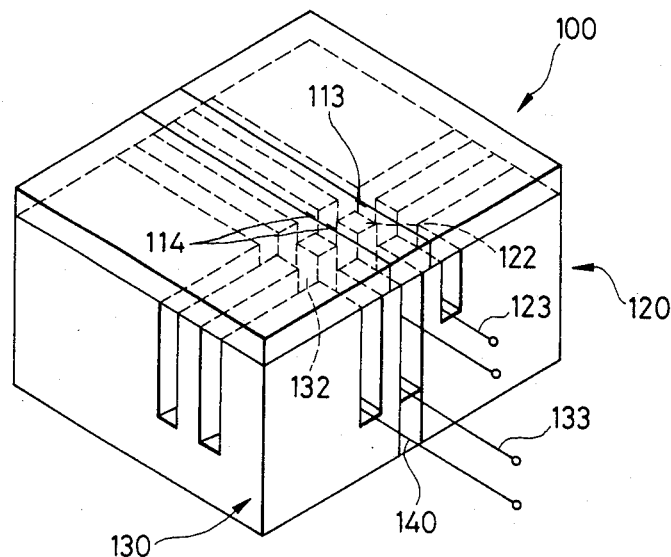
FIG. 11 is a perspective view showing another embodiment of the magnetic head of the invention in a state of its members joined together.
Figure 12:
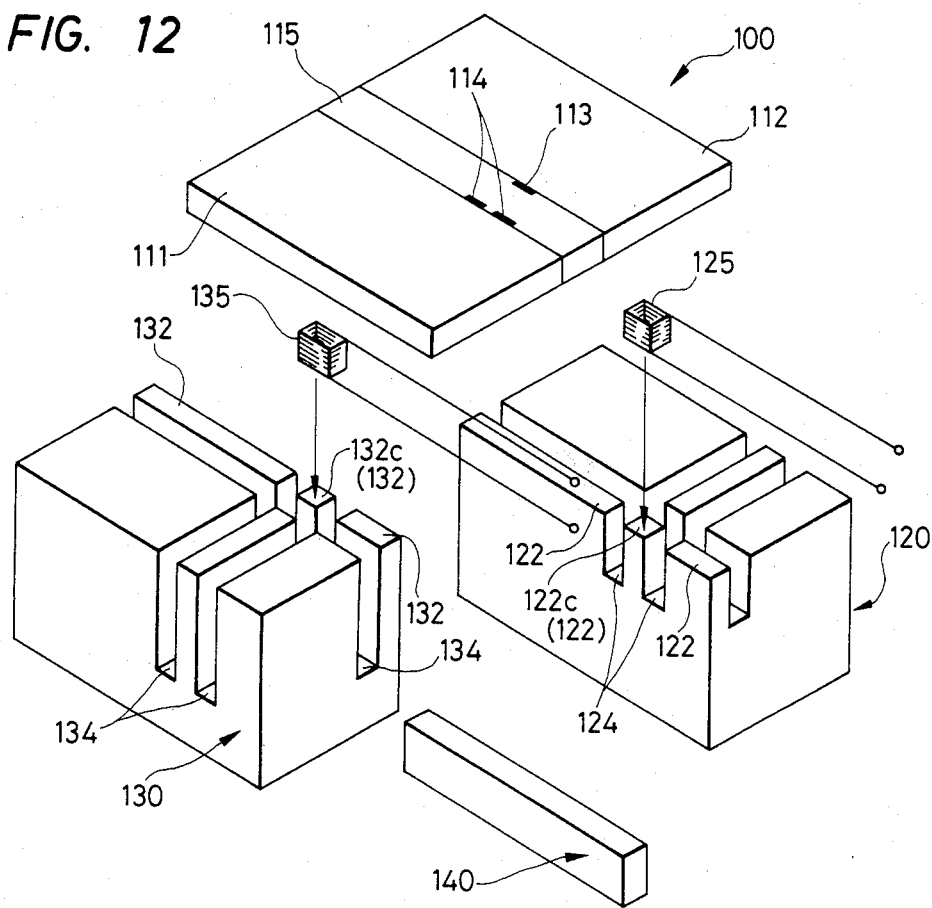
FIG. 12 is a perspective view showing the same in a state of its members prior to the joining.

In the following other embodiments of the invention will be described with reference to FIGS. 11 to 22, in which FIGS. 11 to 12 correspond to FIGS. 16 to 17. FIG. 11 shows a state of a slider subassembly 110, a core block 120 on the recording and reproducing side, and a core block 130 on the erasing side as joined together and FIG. 12 shows a state of these members prior to the joining.

Figure 13:
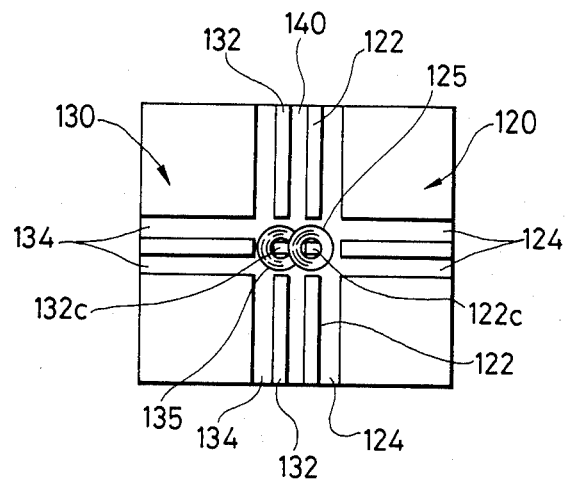
FIG. 13, 14, and 15 are a plan view, a front view, and a side view showing the above with the slider subassembly excluded therefrom.
Figure 14:
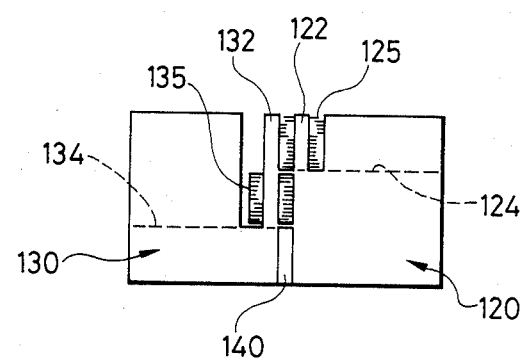
Figure 15:
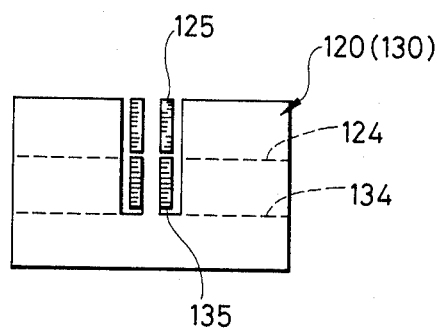

The core block 120 on the recording and reproducing side and the core block on the erasing side are provided, respectively, with coil grooves 124, 134 around the leg portions 122c and 132c, which are the central ones of the leg portions 122, 132 formed at the joining surfaces of both the blocks; the grooves 124, 134 are provided vetically, that is, in the direction parallel to the extensions of the magnetic thin film 113, 114. Of the coil grooves 124 and 134, the coil grooves 134 provided on the core block 130 on the erasing side are formed deeper than the coil grooves 124 provided on the core block 120 on the recording and reproducing side, and therefore, the recording and reproducing coil 125 and the erasing coil 135 put in to the bottoms of the coil grooves 124, 134 are positioned at different heights. Besides, the recording and reproducing coil 125 and the erasing coil 135 are disposed in such a positional relationship as to partly overlap each other when viewed from the side of the slider subassembly 110 in the direction parallel to the axes of the coils as shown in FIGS. 13 to 15. Between the joining surfaces of the core block 120 on the recording and reproducing side and the core block 130 on the erasing side, there is interposed below the ersing coil 135 a magnetical insulating spacer 140 made of nonmagnetic material, and the recording and reproducing coil 125 and the erasing coil 135 are adapted to overlap each other by the tickness corresponding to the thickness of the magnetical insulating sppcer 140. The leg portions 122c and 132c with the recording and reproducing coil 125 and the erasing coil 135 mounted thereon are held at their upper ends in close contact with the magnetic thin film 113, 114, respectively.

The magnetical insulating spacer 140 serving as the spacer has also such a function as to prevent the magnetic flux produced by the erasing current flowing through the erasing coil 135 from leaking out to the core block 120 on the recording and reproducing side and thereby to prevent the recording magnetic field produced by the recording and reproducing coil 125 from being disturbed by the erasing magnetic field.

The present magnetic head as described above is provided with the recording and reproducing coil 125 and the erasing coil 135 that are positioned at different heights and partly overlapping each other if a plan view thereof is taken, it is apparent that the distance betweeen the leg portions 122c and 132c or the distance l between the recording and reproducing magnetic thin film 113 and the erasing magnetic thin film 114 which is held in close contact with the leg portions 122c and 132c, can be made smaller than the case where the recording and reproducing coil 125 and the erasing coil 135 are arranged side by side at the same heights.

(A Further Embodiment)

Figure 16:
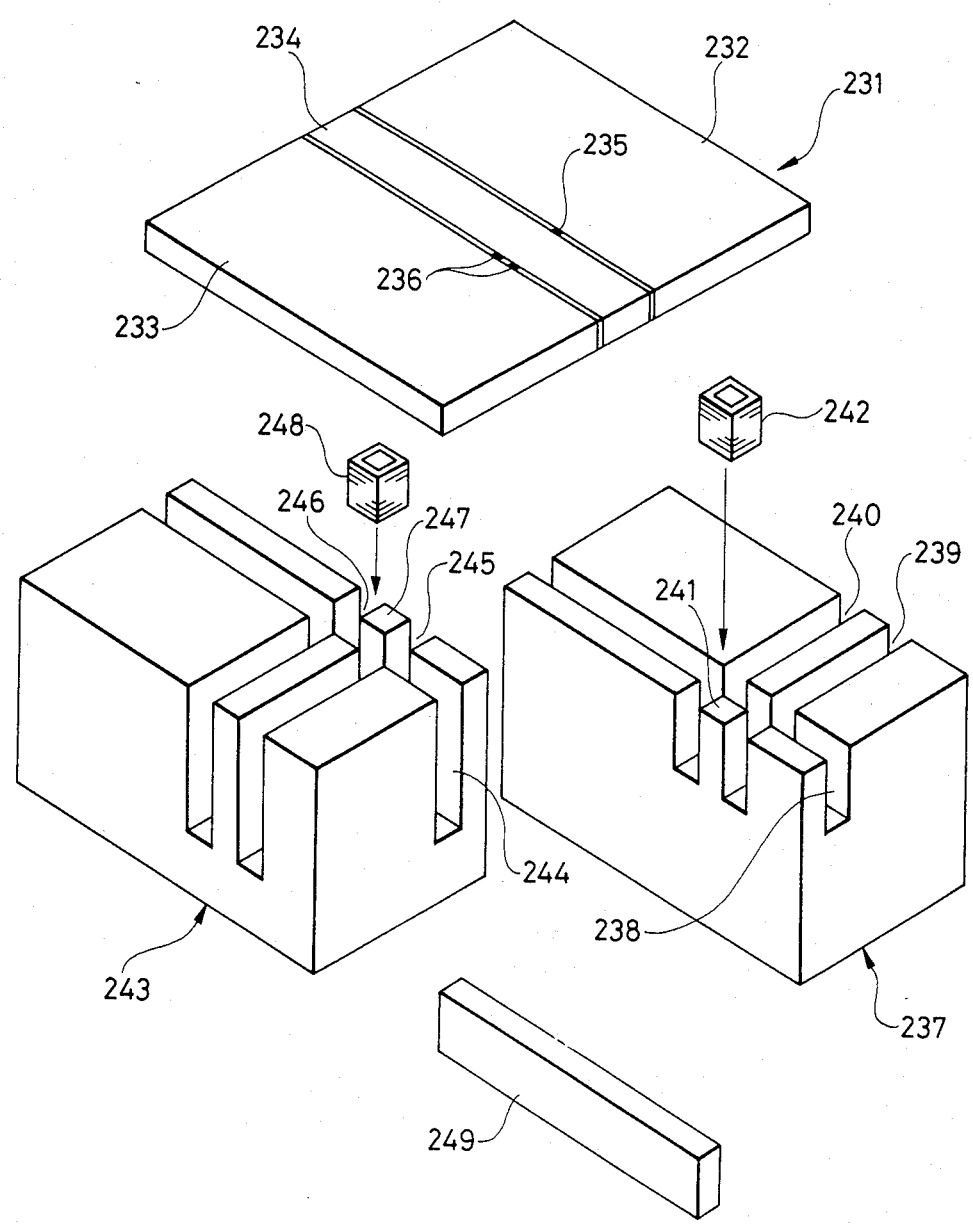
FIG. 16 is an exploded perspective view of another embodiment of the magnetic head for vertical magnetic recording of the invention.

A further embodiment will be described below with reference to FIGS. 16 to 22, in which FIG. 16 is an exploded perspective view showing the present embodiment of the invention and FIGS. 17 to 21 are process drawings for explaing an outline of the producing process of the magnetic head.

In FIG. 16, 231 denotes a slider subassembly, which slider subassembly 231 is constituted of slider blanks 232, 233 and a center block 234 all alike made of nonmagnetic material and provided with recording and reproducing magnetic thin film 235 and erasing magnetic thin film 236 formed therebetween. The top surface of the slider subassembly 231 as shown in the drawing is the surface to oppose the magnetic recording medium. Denoted by numeral reference 237 is a recording and reproducing core made of nonmagnetic material, in which a first pillar portion 241 is formed by a plurality of relatively shallow grooves 238, 239, 240 provided thereon, and a recording and reproducing coil 242 is put on the first pillar portion 241 and fixed at the base portio thereof. Denoted by numeral reference 243 is an erasing core likewise made of nonmagnetic material, in which a second pillar 247 taller than the first pillar portion 241 by a predetermined distance is formed by a plurality of deeper grooves 244, 245, 246 provided thereon, and an erasing coil 248 is put on the second pillar portion 247 and fixed at the base portion thereof. And, 249 denotes a spacer made of nonmagnetic material to be inserted between the recording and reproducing core 237 and the erasing core 243.

When those members are assembled, the recording and reproducing core 237 and the erasing core 243 are integrated with the spacer 249 interposed therebetween at the bottom portion of the assembly, retaining the first and second pillar portions 241, 247 right opposite to each other. Then, the backside of the slider subassembly 231 is fixed to the recording and reproducing core 237 and the erasing core 243, retaining the magnetic thin film 235 in close contact with the first pillar portion 241 and the pair of segments of the magnetic thin film 236 in close contact with the second pillar portion 247, and the magnetic head is thus completed. At this time, since the second pillar portion 247 is taller than the first pillar portion 241 by a predetermined distance, the top end of the erasing coil 248 is positioned lower than the bottom end of the recording and reproducing coil 242, and thus both the coils 242, 248 are arranged with a difference in level.

Now, the process for producing the magnetic head will be described more specifically in the following.

FIGS. 17 (a) and (b) are showing the process for forming magnetic thin film on the surface of slider blanks made of nonmagnetic material. In FIG. 17 (a), 232 denotes a slider blank made of nonmagnetic material such as ceramic, nonmagnetic ferrite, carbon compound material, or the like in a flat rectangular parallelopipe, which slider blank 232 is provided on its surface 232a with a plurality of strips, disposed at predetermined spaces, of recording and reproducing magnetic thin film 35 formed from magnetic material such as cobalt amorphous, permalloy series, sendust series, or the like by evaporation, sputtering, epitaxial method, or the like. In FIG. 17 (b), 233 denotes a slider blank made of the same nonmagnetic material as the slider blank 232 in a flat rectangular parallelopipe, and on the surface 233a of the slider blank 233 are formed a plurality of pairs of strips of erasing magnetic thin film 236 disposed at predetermined spaces, which erasing magnetic thin film 236 is formed from magnetic material such as cobalt amorphous, permalloy series, sendust series, or the like by the same method as the magnetic thin film 235.

Figure 19:
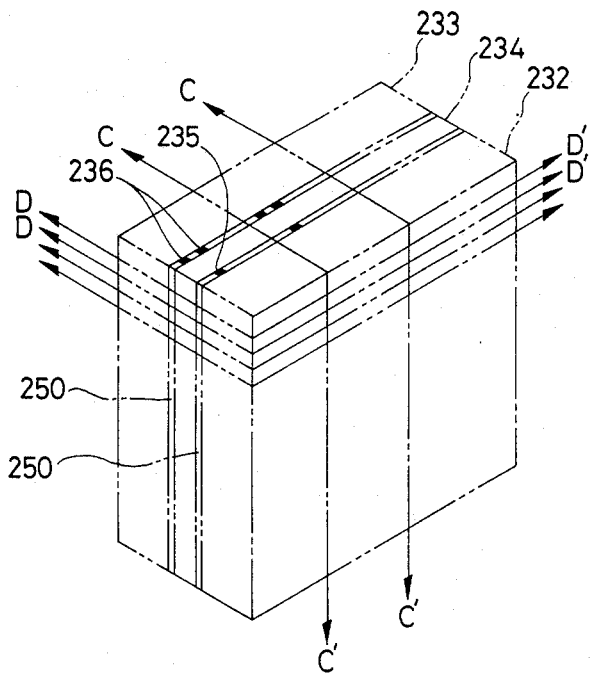
Figure 20:
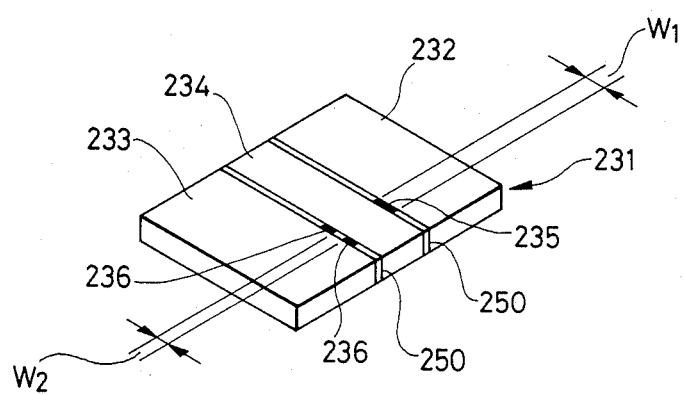

FIG. 18 is a process drawing showing the process to assemble the slider blanks 232 and 233 which have been provided thereon with the magnetic thin film 235,236 as described above with a center block 234 made in a flat parallelopipe of the same material as the slider blanks interposed therebetween. FIG. 19 is a process drawing showing a state of the slider blanks 232, 233 and the center block 234 as assemble as described above and fixed together with resin, fusion glass, or similar adhesive material 250. FIG. 20 shows a slider subassembly 231 provided by cutting the joined body as shown in FIG. 19 along the lines C—C' and D—D'. The relative positioning between the slider blanks 232 and 233 and the center block 234 at their assembling should be made so that (refer to FIG. 20) the effective record width $W_1$ recorded by the magnetic thin film 235 would be made into a specified width $W_2$ by erasing action of the magnetic thin film 236. Only by making this positioning accurately, a number of the slider subassemblies 231 cut out from the joined body are all uniformly provided with the magnetic thin film 235, 236 disposed in a highly accurate positional relationship. Accordingly, the positioning work has, after all, been simplified and accuracy in the positioning has been made easily attainable.

While the magnetic thin film 235, 236 was described in the above to be formed on the slider blanks 232, 233, the same may be formed on both sides of the center block 234 and the slider blanks 232, 233 may then be attached thereto.

Now, the process for forming the recording and reproducing core 237 and the erasing core 243 which are assembled with the slider subassembly 231 will be described with reference to FIGS. 21 (a) and (b) in the following.

Figure 21A:
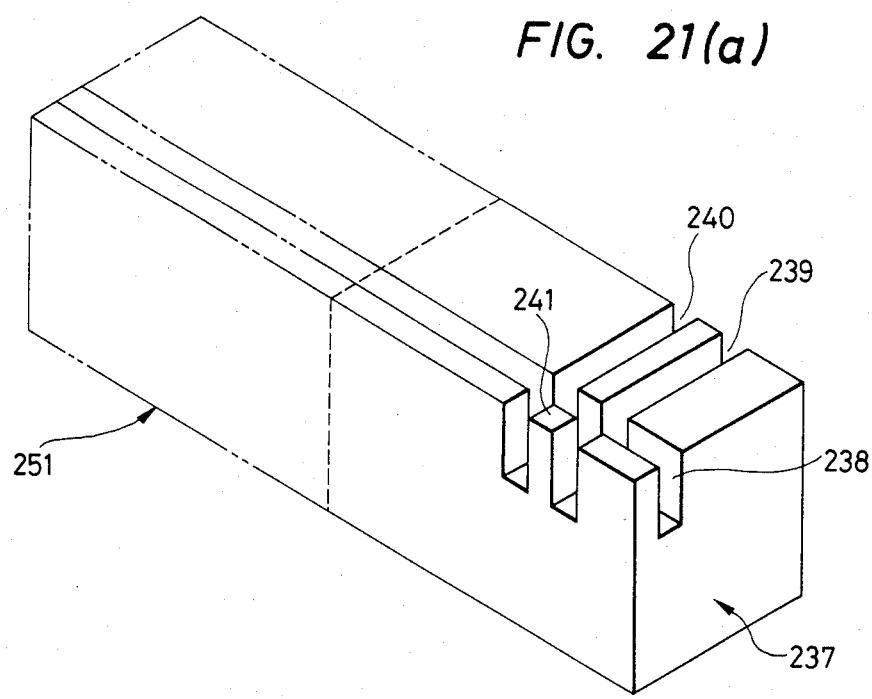
Figure 21B:
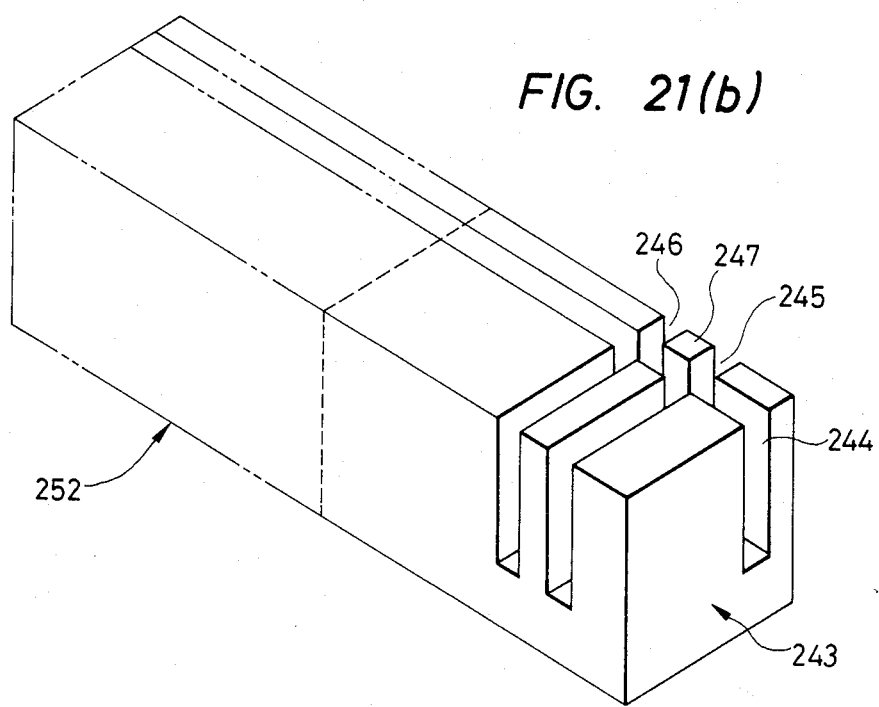

FIG. 21 (a) shows the process for forming the recording and reproducing core 237. First, an elongated rectangular parallelopiped block 251 made of magnetic material such as ferrite, sendust, or the like is longitudinally provided with a rather shallow groove 238 and transversely provided with a plurality of pairs of grooves 239, 240 of the same depth as the groove 238 crossing the same at right angles. Thus, a plurality of first pillar portions 241 each formed by the grooves 238, 239, 240 are provided along the length of the block 251 at certain intervals. Then, by cutting the block 251 into predetermined dimensions, a plurality of the recording and reproducing cores 237 each having one pillar portion 241 are provided.

FIG. 21 (b) shows the process for forming the erasing core 243, which is virtually the same as that for the above described recording and reproducing core 237.

First, a groove 244 deeper than the groove 238 on the recording and reproducing core 237 by a predetermined distance is longitudinally formed on an elongated parallelopiped block 252 made of magnetic material such as ferrite, sendust, or the like, and a plurality of pairs of grooves 245, 246 are transversely formed thereon, which grooves 245, 246 are of the same depth as the groove 244 and disposed to cross the same at right angles. Thus, a plurality of second pillar portions 247 taller than the first pillar portion 241 by a predetermined distance ar formed being defined by the deeper grooves 244, 245, 246 and disposed along the length of the block 252 at certain intervals. By cutting the block 252 into predetermined dimensions, a plurality of the erasing cores 243 each having one second pillar portion 247 are provided.

Though not shown in the drawing, a column-shaped spacers 249 having the same length as the recording and reproducing core 237 and the erasing core 243 are provided by cutting a member of nonmagnetic material such as ceramic, nonmagnetic ferrite, carbon compound material, or the like into predetermined dimensions.

The slider subassembly 231, recording and reproducing core 237, erasing core 243, and the spacer 249 provided as above are assembled and integrated in the same way as described with reference to FIG. 16 to be completed into a magnetic head. That is, the recording and reproducing core 237 and erasing core 243 are assembled with the spacer 249 interposed therebetween in such a way that the first and second pillar portions 241 and 247 will be disposed just opposite to each other and then these members are fixed together with resin, fusion glass, or the like. Then, the recording and reproducing coil 242 is put on the first pillar portion 241 of the recording and reproducing core 237 and fixed in place and the erasing coil 248 is put on the second pillar portion 247 of the erasing core 243 and fixed in place. At this time, since the second pillar portion 247 is taller than the first pillar portion 241 by a predetermined distance, the top end of the erasing coil 248 is positioned below the bottom end of the recording and reproducing coil 242 and thus both the coils 242, 248 are provided with a difference in level. Thereafter, the slider subassembly 231 is assembled with the recording and reproducing core 237 and erasing core 243 in such a way that the magnetic thin film 235 on the slider subassembly 231 is put in close contact with the first pillar portion 241 and the pair of segments of magnetic thin film 236 are put in close contact with the second pillar portion 247, and then these members are fixed together with resin, fusion glass, or the like to provide a complete magnetic head.

Accordingly, not only the recording and reproducing coil 242 but also the erasing coil 248 can be mass produced separately by such a method as the self bonding method and the need for the manual winding work is thus eliminated. And, since the erasing coil 248 is provided only around the second pillar portion 247, which is a part connected with the magnetic thin film 236, not the whole, of the erasing core 243, the leakage flux can be kept low and the required quantity of the wire can be reduced. Thus, the problems of the prior art as inefficiently in use of the erasing current and such expensiveness have been solved. Further, by virtue of the positioning of the recording and reproducing coil 242 and the erasing coil 248 at different heights, the space between the first pillar portion 241 and the second pillar portion 247 can be reduced according to the need, and as a result, the space between the recording and reproducing magnetic thin film 235 and the erasing magnetic thin film 236 can be reduced for enabling high-density recording.

Figure 22:
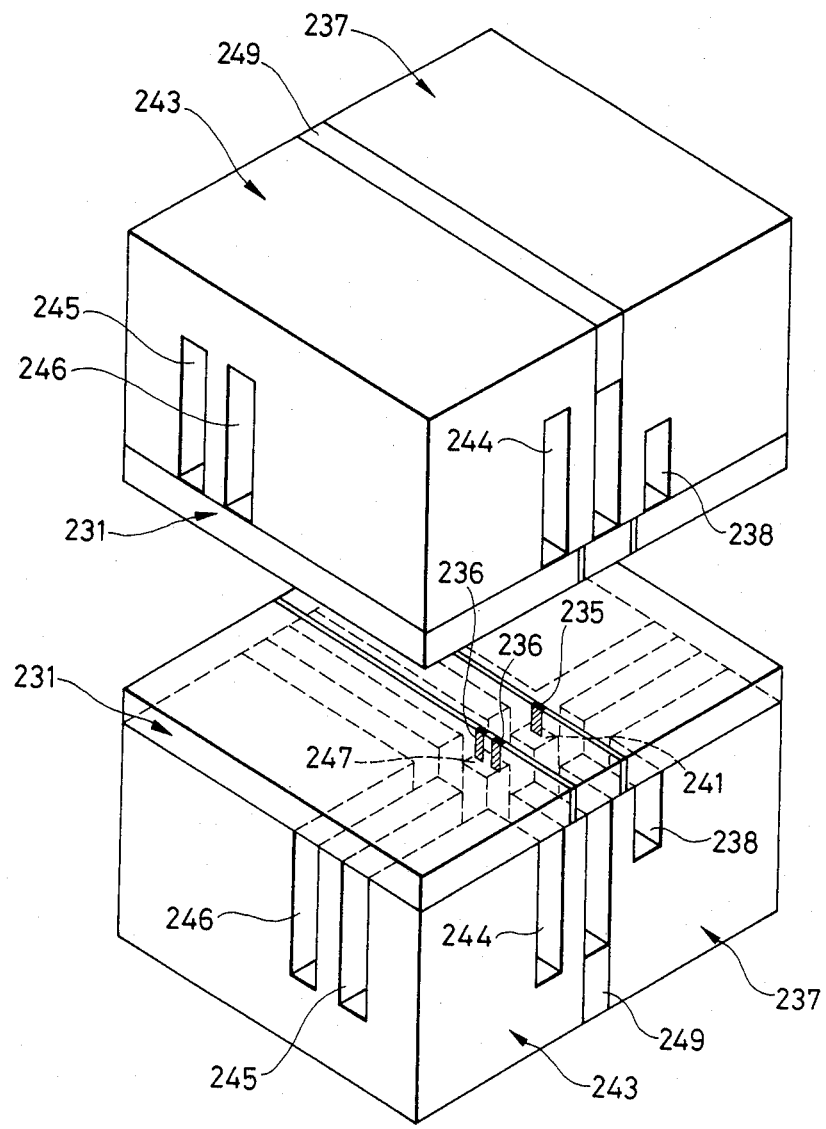
FIG. 22 is a perspective view showing an example of the use of the above embodiment of the magnetic head.

FIG. 22 shows an example of use of the above described magnetic heads, in which two magnetic heads of the same structure are disposed to face each other with a magnetic recording medium (not shown) interposed therebetween, where, however, the positions of the recording and reproducing tracks of both the magnetic heads are disposed so as not to oppose each other. By the described arangement, both sides of the magnetic recording medium can be used for recording and reproducing while the magnetic heads are also serving as the image cores for each other.

(Effects of the Invention)

According to the present invention so far described, a slider blank 20 provided with the magnetic thin film for recording and reproducing disposed thereon at predetermined spaces and a slider blank 23 likewise provided with the magnetic thin film 25, 25 for erasing disposed thereon at predetermined spaces are assembled with a center block 26 interposed therebetween, positioned as specified, and then fixed together with adhesive, synthetic resin, fusion glass, or the like 27, and thereafter cut into pieces and the slider subassemblies 28 are thus provided. Therefore, it has been made possible to mass-produce the slider subassembly 28 having high dimensional accuracy and stable quality. And the need for positioning between the recording and reproducing magnetic thin film 22 and the erasing magnetic thin film 25 at the time of assembling an individual magnetic head has been eliminated. Further, since the cut surface is made in a common flat surface, no difference in level is produced at the assembly work on the surface to slide along the magnetic recording medium, the grinding work has become simpler than in the conventional producing process. As to the winding work, the recording and reproducing coil 51 can be mass-produced separately in advance if such coiling method as the self bonding method is employed, and then it is only required just to put the coil on the leg portion 37 of the magnetic core assembly A. And, the winding 50 on the erasing side can also be provided more simply by winding a wire along the winding grooves 41, 42, which are open to the outside before the slider subassembly 28 is attached to the magnetic core subassembly A, in comparison with the conventional winding work in which it was required to pass the wire through a thin hole. Thus, the man-hours for the winding work have been greatly reduced, the need for skilled winding workers is eliminated, and even the use of a winding machine to facilitate the winding work has been made possible.

When high-density recording is to be made in a magnetic recording medium with a small radius of curvature, it becomes necessary to make the distance between the magnetic thin film 22 on the recording and reproducing side and the magnetic thin film 25, 25 on the erasing side smaller. If not, when the effective record width 13 recorded by the magnetic thin film 4 is erased by two segments of the magnetic thin film 8, 8, the positions in the record width 13 which have been erased will be deviated from the right positions, or, in other words, with such a magnetic head, the magnetic recording medium cannot be effectively used toward the inside (smalldiametered portion). Since, as previously described, the coil grooves 9a, 9b are provided on the center slider member 9 in the magnetic head of the conventional structure, there is a limit in reducing the distance between the magnetic thin film 4 and the magnetic thin film 8, 8. But in the magnetic head of the structure of the invention, since it is arranged so that the leg portion 37 of the magnetic core 29 is held in close contact with the magnetic thin film 22 formed on the slider subassembly 28 and the leg portion 48 of the magnetic core 39 is held in close contact with the magnetic thin film 25, 25 formed on the slider subassembly 28, it has been made possible to make the distance between the magnetic thin film 22 and the magnetic thin film 25, 25 smaller. Thus, it has been enabled to make effective record in a magnetic recording medium of smaller radius of curvature, or high-density recording has been made possible. Thus, the provision of structure and method for production of a magnetic head which is simple in structure, easy to assemble, ensuring accuracy in manufacture and product, reducing winding man-hours, and suited for mass production has been attained.

Further, when the present magnetic heads are applied to recording and reproducing on both sides of a magnetic medium as shown in FIG. 10, the need for the image core 53 can be eliminated by using the magnetic heads in combination which are arranged so that their recording and reproducing tracks may not oppose each other.

(Effects of Another Embodiment) (1-a)

In a magnetic head for vertical magnetic recording provided by joining a slider subassembly with magnetic thin film for recording and reproducing and magnetic thin film for erasing formed thereon, a core block on the recording and reproducing side corresponding to the magnetic thin film for recording and reproducing, and a core block on the erasing side corresponding to the magnetic thin film for erasing together, the magnetic head of the present invention has, as described above, arranged the recording and reproducing coil to be provided for the core block on the recording and reproducing side and the erasing coil to be provided for the core block on the erasing side so as to partly overlap each other when a plan view of the same is taken, and therefore, the distance between the recording and reproducing thin film and the erasing thin film can be made further smaller. Hence, satisfactory recording can be made in a rotating magnetic recording medium toward the portion closer to the center of rotation and high-density recording effectively using the smaller-diametered portion has been made possible.

(Effects of Another Embodiment) (1-b)

In a magnetic head for vertical magnetic recording provided by joining a slider subassembly with magnetic thin film for recording and reproducing and magnetic thin film for erasing formed thereon, a core block on the recording and reproducing side corresponding to the magnetic thin film for recording and reproducing, and a core block on the erasing side corresponding to the magnetic thin film for erasing together, the magnetic head of the invention has interposed a magnetical insulating spacer of nonmagnetic material between the joining surfaces of the core block on the recording and reproducing side and the core block on the erasing side, and therefore, the erasing magnetic flux from the erasing coil is prevented from leaking out to the core block on the recording and reproducing side, so that, the recording magnetic field to be produced by the recording current flowing through the recording and reproducing coil is not disturbed by the erasing magnetic flux. And, since the erasing flux does not leak out, the erasing efficiency is improved accordingly. And further, since the magnetical insulating spacer is only interposed between the core block on the recording and reproducing side and the core block on the erasing side, no complicacy in structure is invited, and so, the simplicity in the manufacture of the magnetic head as proposed in Japanese Patent Application No. 59-138749 will be held unimpaired.

(Effects of Further Embodiment) (2)

According to the invention, since the recording and reproducing coil can be mounted on the first pillar portion of the recording and reproducing core, which pillar portion is that part of the core which is connected with the recording and reproducing magnetic thin film, and the erasing coil can be mounted on the second pillar portion, which pillar portion is that part of the core which is connected with the erasing magnetic thin film, these coils can be separately mass-produced by such a method as the self bonding method, so that the winding work has been greatly simplified. And, though the erasing current efficiency was low and a large quantity of wire material was required with the prior art, the erasing current efficiency has been improved and the quantity of the required wire material has been reduced, and production at low cost has been made possible by the invention. Besides, since the recording and reproducing coil and the erasing coil are arranged to be positioned at different heights, the distance between the first pillar portion and the second pillar portion, and hence the distance between the recording and reproducing coil and the erasing coil has become reducible and high-density recording has therefore been made possible.

What is claimed is:

1. A magnetic head for vertical magnetic recording comprising:
a slider subassembly having one side thereof to be disposed in contact with a magnetic recording medium and formed by portions made of a nonmagnetic material holding a recording and reproducing magnetic thin film and an erasing magnetic thin film which are oriented in a direction perpendicular to the magnetic recording medium;
a core block made of magnetic material which is disposed below the other side of the slider subassembly opposite from the magnetic recording medium, said core block having a first leg portion oriented in said perpendicular direction on a recording and reproducing side of said core block located below and extending in contact with said recording and reproducing magnetic thin film of said slider subassembly, a second leg portion oriented in said perpendicular direction on an erasing side of said core block located below and extending in contact with said erasing magnetic thin film of said slider subassembly, a recording and reproducing coil assembled on said first leg portion facing said slider subassembly with its coil axis parallel to said perpendicular direction, and an erasing coil assembled on said second leg portion facing said slider subassembly with its coil axis parallel to said perpendicular direction;
wherein said recording and reproducing coil and said erasing coil are positioned at different heights from each other on their respective leg portions and disposed so as to partially overlap each other when viewed from said perpendicular direction parallel to the axes of the coils.

2. A magnetic head for vertical magnetic recording as set forth in claim 1, wherein said first leg portion is formed by a first groove on the recording and reproducing side of said core block, said second leg portion is formed by a second groove on the erasing side of said core block, and said first and second grooves are different in depth.

3. A magnetic head for vertical recording as set forth in claim 2, wherein a magnetical insulating spacer made of nonmagnetic material is interposed between the recording and reproducing side and the erasing side of said core block.

4. A magnetic head for vertical magnetic recording as set forth in claim 2, wherein said nonmagnetic material is composed of one or more of glass, ceramic, nonmagnetic ferrite, synthetic resin, and nonmagnetic metal.

5. A magnetic head for vertical magnetic recording as set forth in claim 2, wherein said magnetical insulating spacer is 1 to 2000 μm in thickness.

6. A magnetic head for vertical magnetic recording as set forth in claim 2, wherein a magnetical insulating spacer is interposed between the recording and reproducing side and the erasing side of said core block.

7. A magnetic head for vertical magnetic recording as set forth in claim 6, wherein said magnetical insulating spacer is 1 to 2000 μm in thickness.

8. A magnetic head for vertical magnetic recording as set forth in claim 1, wherein a magnetical insulating spacer is interposed between the recording and reproducing side and the erasing side of said core block.

9. A magnetic head for vertical magnetic recording as set forth in claim 8, wherein said magnetical insulating spacer is formed of a thin film.

10. A magnetic head for vertical magnetic recording as set forth in claim 9, wherein said nonmagnetic material is composed of one or more of glass, ceramic, nonmagnetic ferrite, synthetic resin, and nonmagnetic metal.

11. A magnetic head for vertical magnetic recording as set forth in claim 1, wherein said nonmagnetic material is composed of one or more of glass, ceramic, nonmagnetic ferrite, synthetic resin, and nonmagnetic metal.

12. A magnetic head for vertical magnetic recording as set forth in claim 1 wherein said magnetical insulating spacer is 1 to 2000 μm in thickness.

* * * * *